US012771649B2

(12) United States Patent
Wang

(10) Patent No.: US 12,771,649 B2
(45) Date of Patent: Oct. 20, 2026

(54) PACKET FORWARDING METHOD AND APPARATUS

(71) Applicant: New H3C Technologies Co., Ltd., Hangzhou (CN)

(72) Inventor: Wei Wang, Beijing (CN)

(73) Assignee: NEW H3C TECHNOLOGIES CO., LTD., Hangzhou (CN)

( * ) Notice: Subject to any disclaimer, the term of this patent is extended or adjusted under 35 U.S.C. 154(b) by 335 days.

(21) Appl. No.: 18/714,812

(22) PCT Filed: Aug. 16, 2022

(86) PCT No.: PCT/CN2022/112753
§ 371 (c)(1),
(2) Date: May 30, 2024

(87) PCT Pub. No.: WO2024/036476
PCT Pub. Date: Feb. 22, 2024

(65) Prior Publication Data
US 2025/0030644 A1 Jan. 23, 2025

(51) Int. Cl.
*H04L 47/62* (2022.01)
*H04L 47/6295* (2022.01)

(52) U.S. Cl.
CPC ...... *H04L 47/6225* (2013.01); *H04L 47/6215* (2013.01); *H04L 47/6295* (2013.01)

(58) Field of Classification Search
CPC ............. H04L 47/6225; H04L 47/6215; H04L 47/6295; H04L 47/56; H04L 47/22;
(Continued)

(56) References Cited

U.S. PATENT DOCUMENTS 11,057,318 B1 * 7/2021 Matthews .............. G06N 3/045
2013/0084063 A1 * 4/2013 Hu .......................... H04L 49/10 370/219

(Continued)

FOREIGN PATENT DOCUMENTS

CN 108282415 7/2018
CN 111431822 7/2020

(Continued)

OTHER PUBLICATIONS

International Search Report and Written Opinion issued in Corresponding PCT Application No. PCT/CN2022/112753, dated Mar. 22, 2023 (English Translation provided).

(Continued)

*Primary Examiner* — Sujoy K Kundu
*Assistant Examiner* — Vladislav Y Agureyev
(74) *Attorney, Agent, or Firm* — NORTON ROSE FULBRIGHT US LLP

(57) ABSTRACT

A packet forwarding method and apparatus is disclosed. The method includes receiving a first packet from a user-side device; caching the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet; forwarding the packet in the first scheduling queue to a second network device according to a scheduling cycle of the first scheduling queue. When the transmission rate span of deterministic flow is large, the deterministic transmission of each deterministic flow can be realized.

20 Claims, 3 Drawing Sheets

(58) Field of Classification Search
CPC ... H04L 47/28; H04L 47/568; H04L 49/3045; H04L 49/90
See application file for complete search history.

(56) References Cited

U.S. PATENT DOCUMENTS

| | | | | |
|---|---|---|---|---|
| 2014/0201761 | A1* | 7/2014 | Dalal | G06F 13/4022 718/108 |
| 2019/0342217 | A1* | 11/2019 | Mazurek | H04L 47/11 |
| 2019/0373086 | A1* | 12/2019 | Qi | H04L 49/9021 |
| 2020/0136986 | A1* | 4/2020 | Southworth | H04L 67/568 |
| 2020/0336435 | A1* | 10/2020 | Zhang | H04L 67/61 |
| 2021/0243080 | A1* | 8/2021 | Brewer | G06F 15/17325 |
| 2022/0021625 | A1* | 1/2022 | Tang | H04L 47/2416 |
| 2022/0224653 | A1* | 7/2022 | Chen | H04J 3/0658 |
| 2022/0321499 | A1* | 10/2022 | DiFerdinando | H04L 45/66 |
| 2022/0345417 | A1* | 10/2022 | Kasichainula | H04L 47/30 |
| 2023/0388242 | A1* | 11/2023 | Zhu | H04L 12/407 |

FOREIGN PATENT DOCUMENTS

| | | | | | |
|---|---|---|---|---|---|
| CN | 112585914 | | | 3/2021 | |
| CN | 113098765 | A | * | 7/2021 | H04L 49/3009 |
| CN | 113382442 | | | 9/2021 | |
| CN | 113872881 | A | * | 12/2021 | H04L 47/2433 |
| CN | 113950104 | | | 1/2022 | |
| CN | 114143378 | | | 3/2022 | |
| CN | 114374653 | | | 4/2022 | |
| EP | 3691199 | B2 | | 8/2020 | |
| WO | WO-2012116540 | A1 | * | 9/2012 | H04L 47/527 |
| WO | WO 2022/068617 | | | 4/2022 | |
| WO | WO 2022/095669 | | | 5/2022 | |

OTHER PUBLICATIONS

Extended European Search Report issued in corresponding European Application No. 22955258.3, dated Nov. 22, 2024.

* cited by examiner

PACKET FORWARDING METHOD AND APPARATUS

CROSS REFERENCE TO RELATED APPLICATION

The present application is a national phase application under 35 U.S.C. § 371 of International Application No. PCT/CN2022/112753, filed Aug. 16, 2022, the entire contents of which are incorporated herein by reference in their entirety.

TECHNICAL FIELD

The present disclosure relates to the technical field of communications, and in particular to a packet forwarding method and apparatus.

BACKGROUND

With the development of the Industrial Internet and the Metaverse, remote interactive services have put forward stricter requirements on network delay, jitter, and packet loss. Deterministic network technology has become a WAN solution meeting the above requirements.

Deterministic network refers to a network that provides deterministic service assurance capabilities for the carried services, and can guarantee the deterministic delay, delay jitter, packet loss rate and other indicators of services. Deterministic network technology is a new quality of service (QOS) guarantee technology.

At present, the deterministic network can be implemented based on the Cyclic Specific Queuing and Forwarding (CSQF) mechanism, and the Software Defined Network (SDN) controller can plan the forwarding path of deterministic service packets in the deterministic network, and specify the CSQF forwarding resources for each hop network device in the deterministic network, so that the network device forwards deterministic service packet according to the specified CSQF forwarding resources.

However, the forwarding technology of the current deterministic network is not mature enough, and the required transmission rates of deterministic services span a wide range. For example, the minimum required transmission rate can be less than 100 Mbps, and the maximum required transmission rate can be greater than 100 Gbps. The current CSQF mechanism cannot realize the forwarding of multiple deterministic service packets with a large transmission rate span.

SUMMARY

The purpose of the examples of the present disclosure is to provide a packet forwarding method and apparatus, so as to realize the forwarding of multiple deterministic service packets with a large transmission rate span. The specific technical solutions are as follows.

In a first aspect, an example of the present disclosure provides a packet forwarding method, which is applied to a first network device and includes:

receiving a first packet from a user-side device;

caching the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

forwarding the packet in the first scheduling queue to a second network device according to a scheduling cycle of the first scheduling queue.

In a second aspect, an example of the present disclosure provides a packet forwarding apparatus, which is applied to a first network device and includes:

a receiving module, to receive a first packet from a user-side device;

a caching module, to cache the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

a forwarding module, to forward the packet in the first scheduling queue to a second network device according to a scheduling cycle of the first scheduling queue.

In a third aspect, an example of the present disclosure provides a network device, which includes:

a processor;

a transceiver;

a machine-readable storage medium, which stores machine-executable instructions that can be executed by the processor to cause the processor to:

receive a first packet from a user-side device through the transceiver;

cache the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

forward the packet in the first scheduling queue to a second network device according to a scheduling cycle of the first scheduling queue through the transceiver.

In a fourth aspect, an example of the present disclosure further provides a machine-readable storage medium storing machine-executable instructions thereon which, when invoked and executed by a processor, cause the processor to implement the method described in the first aspect above.

In a fifth aspect, an example of the present disclosure provides a computer program product which causes the processor to implement the method described in the first aspect above.

With the above technical solution, after receiving a first packet sent by a user-side device, the first network device can cache the first packet in a first scheduling queue, corresponding to a deterministic flow to which the first packet belongs, in a first queue sequence, and forward the packet in the first scheduling queue to a second network device according to a scheduling cycle of the first scheduling queue. The first queue sequence includes a first number of cyclically consecutive scheduling queues, wherein the first number is the ratio between the rate of the outbound interface used by the first network device to forward the first packet and the minimum inbound interface rate of the first network device, that is, the number of scheduling queues depends on the minimum inbound interface rate. In this way, the packet of each deterministic flow simultaneously received by inbound interfaces of the first network device has a corresponding scheduling queue for caching the packet. In this way, even if the transmission rate span of each deterministic flow is large, the packet of each deterministic flow can be cached in the scheduling queue corresponding to the deterministic flow, and sent out in the scheduling cycle corresponding to the respective scheduling queue, so that the deterministic transmission of each deterministic flow can be realized when the transmission rate span of the deterministic flow is large, which is more in line with the needs of deterministic services.

BRIEF DESCRIPTION OF THE DRAWINGS

In order to more clearly describe the technical solution of the examples of the present disclosure and the prior art, drawings needed in the examples and the prior art will be briefly described below. Obviously, the drawings described below are for only some examples of the present disclosure, one of ordinary skills in the art can also obtain other examples based on these drawings without any creative efforts.

DETAILED DESCRIPTION

Figure 1:
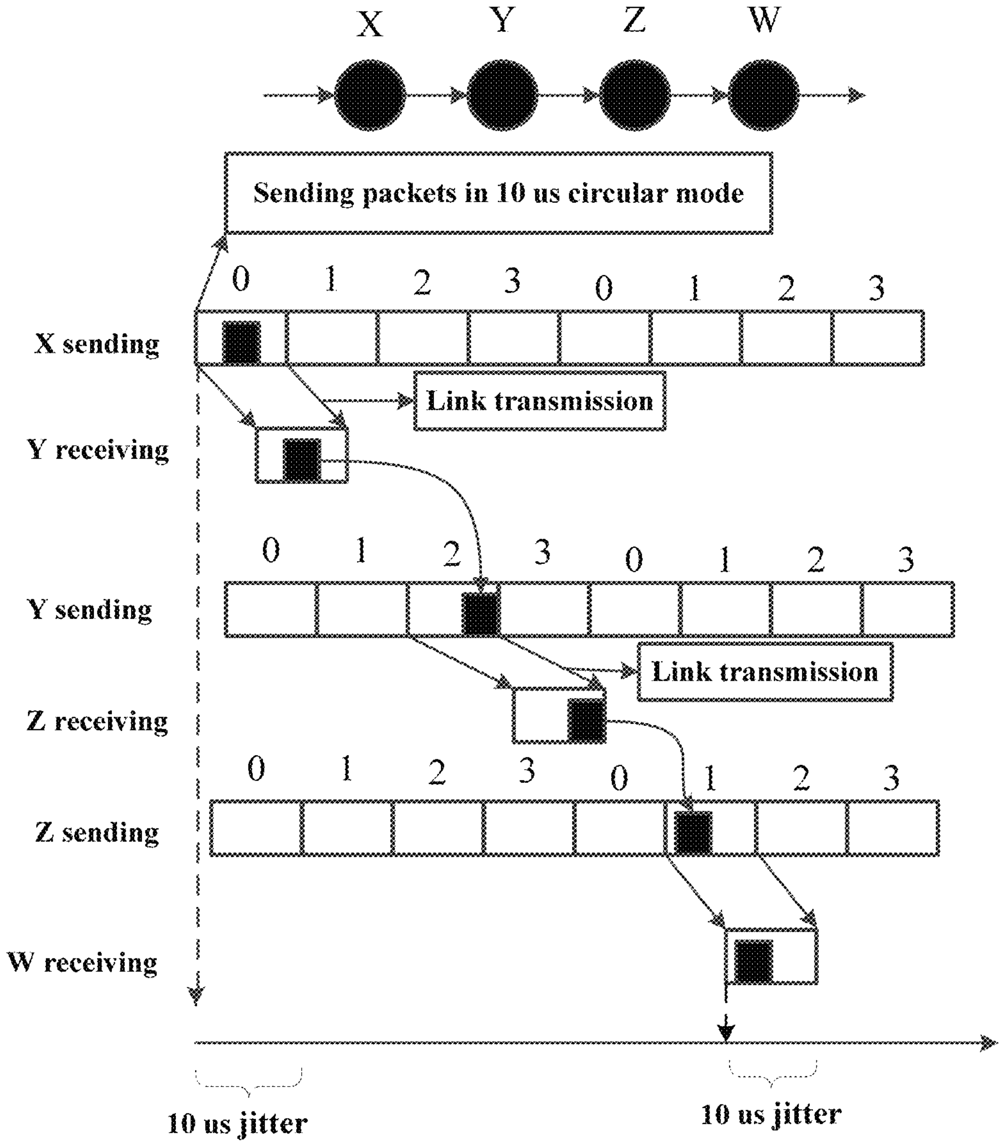
FIG. 1 is a schematic diagram of a forwarding mechanism for a deterministic flow according to an example of the present disclosure.

In order to make objectives, technical solutions and advantages of the present disclosure more apparent, the present disclosure now will be described in detail with reference to the accompanying drawings and the detailed description. Obviously, the examples described are only some of the examples of the present disclosure instead of all the examples. All further examples obtained by those of ordinary skills in the art based on the examples herein without any creative efforts are within the scope of the present disclosure.

For ease of understanding, the related concepts involved in the examples of the present disclosure are first introduced.

Each network device in a deterministic network divides each cycle T into multiple consecutive small cycles with the same duration. For example, T is divided into 4 small cycles, which are Cycle0, Cycle1, Cycle2 and Cycle3, respectively. Certain deterministic flows are only forwarded within a specified small cycle. For example, deterministic flow 0 is forwarded in Cycle0 in each cycle T, deterministic flow 1 is forwarded in Cycle1 in each cycle T, deterministic flow 2 is forwarded in Cycle2 in each cycle T, and deterministic flow 3 is forwarded in Cycle3 in each cycle T, so that the delay jitter of the network device can be limited within T, thereby achieving bounded delay jitter.

The jitter of each network device on the forwarding path of the deterministic flow will not increase the delay jitter of a network device following this network device, that is, the jitter is independent of the number of network devices included in the forwarding path. However, the increase in the number of network devices will increase the total delay of the packet on the forwarding path.

The above cycle T is a time slot width of a scheduling queue of a predefined deterministic flow, the delay jitter of the entire forwarding path ranges from 0 to 2T. For example, if t=10 us, the delay jitter is 20 us in the worst case, regardless of the length of the forwarding path and the number of network devices.

As shown in FIG. 1, assuming that X, Y, Z and W are four consecutive network devices in the forwarding path, the cyclic forwarding cycle T of each network device consists of four small cycles of 0, 1, 2, and 3, and the duration of each small cycle is 10 us. After each network device receives a packet, it sends the packet within a preset cycle corresponding to a deterministic flow to which the packet belongs, that is, a mapping relationship between the deterministic flow and the cycle is preconfigured in each network device.

For example, the device X sends a packet in Cycle0, and the packet is transmitted in a link between the device X and the device Y.

After the device Y receives the packet, it sends the packet in Cycle2, and then the packet is transmitted in the link between the device Y and the device Z.

After Z device receives the packet, it sends the packet in its own Cycle1, and then the packet is transmitted in the link between device Z and the device W, and the device W can receive this packet.

In the above process, due to the constraint of a stable cyclic mapping relationship, once the sending cycle of the packet by device X is determined, the receiving cycle of the packet by device W can also be determined, and the delay jitter of the packet each time when transmitting the deterministic flow from device X to device W can be controlled within 10 us.

It should be noted that clocks in each of network devices in the deterministic network can be synchronized, and FIG. 1 exemplarily shows a situation where there are slight differences in the clocks of each of network devices.

Figure 2:
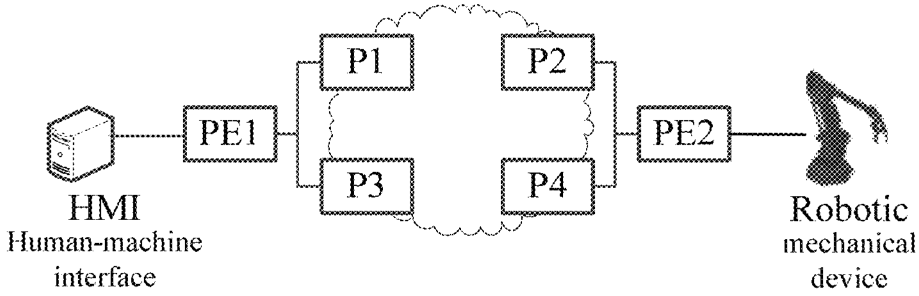
FIG. 2 is a schematic diagram of a network architecture of a deterministic network according to an example of the present disclosure.

As shown in FIG. 2, which is a schematic diagram of a network architecture of a deterministic network. Taking the deterministic network between a human machine interface (HMI) and a mechanical device (robotic) as an example, the deterministic network includes a service provider network edge (Provider Edge, PE) device and a P (Provider) device, wherein the P device refers to a network-side core device. Both the HMI and robotic in FIG. 2 are user-side devices.

FIG. 2 exemplarily shows PE1, PE2, and P1 to P4, to which the number of the devices in actual implementation is not limited.

Wherein, the PE device is used to implement packet forwarding between a user-side device and a network-side device in the deterministic network.

The SDN controller can plan, for the PE device in advance, an SRv6 forwarding path of a packet entering the deterministic network from the user-side device, and plan a forwarding resource for each hop network device in the forwarding path, so that each network device forwards the packet of deterministic flow according to the specified resource.

Wherein, the packet entering the deterministic network from the user-side device refers to an IP packet with deterministic service requirements sent by the user-side device and encapsulated through Ethernet, that is, the IP packet of deterministic flow.

The deterministic flow is a delay-sensitive service flow, and the non-deterministic flow is a delay-insensitive service flow. For example, the non-deterministic flow can be a flow for which the best effort forwarding strategy can be used.

The PE device has a dedicated user-side interface for the deterministic flow, which is not used by the non-deterministic flow. If the user-side interface needs to be used by both the deterministic flow and the non-deterministic flow, time sensitive network (TSN) technology can be used to distinguish the deterministic flow and the non-deterministic flow from each other.

After receiving a packet sent by the user-side device through the user-side interface, the PE device forwards the packet to the next network device through a network-side interface according to the SRv6 forwarding path planned by SDN and a specified scheduling cycle, so that the packet is transmitted in the deterministic network. Wherein, the SRv6 packet encapsulated by Ethernet with a time synchronization mechanism is transmitted in the deterministic network. That is to say, after receiving the packet sent by the user-side device, the PE device will encapsulate the packet as an SRv6 packet, and time synchronization of each of network devices in the deterministic network is realized.

The network-side interface of the PE device can also receive the SRv6 packet forwarded by the P device, and transmit the received SRv6 packet to a destination user-side interface according to the SRv6 forwarding path, and send the packet to the user-side device at the user-side interface according to a first in first out scheduling mechanism.

The P device is mainly responsible for packet forwarding between the network-side device and the network-side device. The inbound interface of the P device forwards the packet according to the SRv6 forwarding path of the received packet using a pre-specified scheduling cycle.

Figure 3:
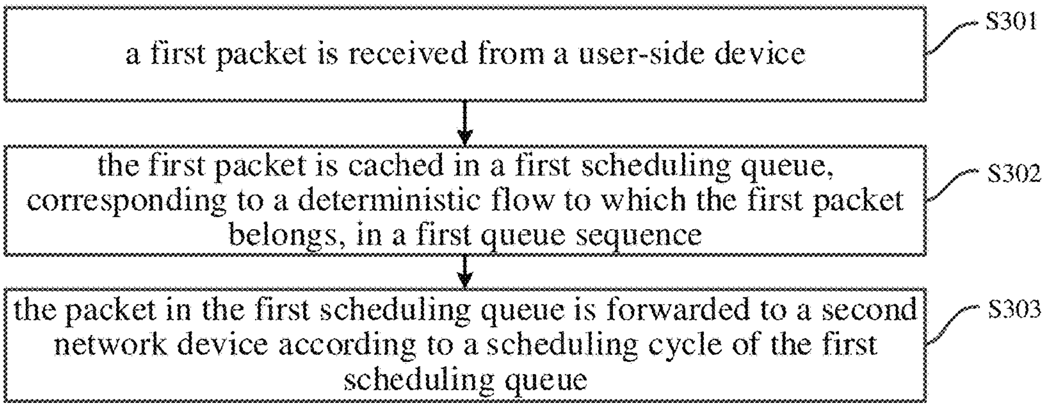
FIG. 3 is a schematic flowchart of a packet forwarding method according to an example of the present disclosure.

In order to make the deterministic network better meet the service requirements, an example of the present disclosure provides a packet forwarding method, which is applied to a first network device, wherein the first network device may be a PE device in a deterministic network. As shown in FIG. 3, the method includes:

At S301, a first packet is received from a user-side device.

At S302, the first packet is cached in a first scheduling queue, corresponding to a deterministic flow to which the first packet belongs, in a first queue sequence.

Wherein, the first queue sequence includes a first number of cyclically consecutive scheduling queues, the first number is the ratio between the outbound interface rate of the first network device and the minimum inbound interface rate of the first network device, and the outbound interface rate is the rate of the outbound interface for forwarding the first packet.

The cycle corresponding to the first queue sequence may be T, and the scheduling cycle of each scheduling queue included in the first queue sequence is a small cycle included in the cycle T.

The outbound interface of the first network device refers to the network-side outbound interface of the first network device, and the inbound interface of the first network device refers to the user-side inbound interface of the first network device, that is, a packet from the user-side device received by the first network device from the user-side inbound interface can be forwarded through the network-side outbound interface.

The first network device may have multiple inbound interfaces, the access rate of each inbound interface may be different, and the minimum inbound interface rate is the minimum rate among the access rates of the multiple inbound interfaces of the first network.

In the example of the present disclosure, the first network device is a device in a deterministic network. By using the deterministic flow forwarding mechanism for the deterministic network, the packet of each deterministic flow that arrive randomly can be sent in a fixed scheduling cycle. Therefore, the number of scheduling queues in the first queue sequence needs to meet the following conditions: when all packets of deterministic flow that need to be forwarded by the first network device arrive at the same time, the first queue sequence needs to have a scheduling queue for caching the packet of each deterministic flow, so as to ensure that the packet of each deterministic flow can be cached into a scheduling queue respectively. In order to meet the above conditions, the number of scheduling queues is the ratio between the outbound interface rate of the first network device and the minimum inbound interface rate of the first network device.

Figure 4:
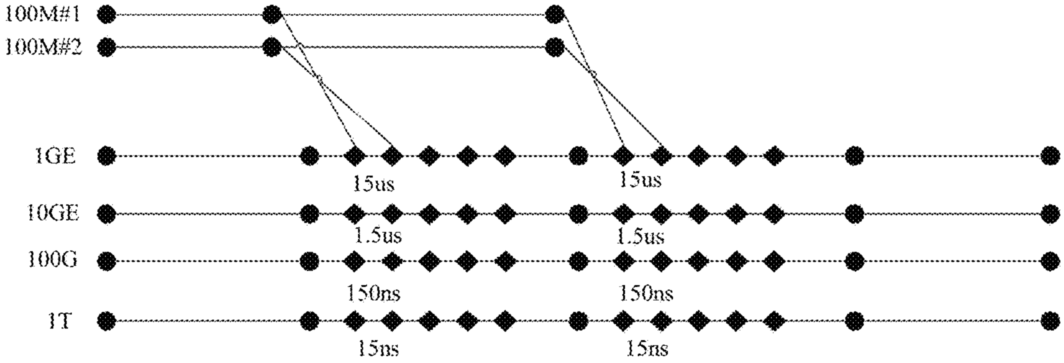
FIG. 4 is a schematic diagram illustrating the deterministic flow transmission according to an example of the present disclosure.

For example, as shown in FIG. 4, four line segments in FIG. 4 represent the scheduling resources of outbound interfaces with four rates respectively, in FIG. 4 there is a queue sequence between every two round dots, and each diamond represents a scheduling sequence.

Assuming that the transmission rates of deterministic flow 1, deterministic flow 2 and other deterministic flows (not shown in FIG. 4) are all 100 Mbps, each deterministic flow includes continuously sent packets, and the length of each packet is equal to is 1.5 KB. If the packets of these deterministic flows arrive at the PE device at the same time, the PE device needs to reserve a scheduling queue for each deterministic flow.

In FIG. 4, the packet of deterministic flow 1 can be cached in the first scheduling queue of each queue sequence, and the packet of deterministic flow 2 can be cached in the second scheduling queue of each queue sequence.

If the size of each scheduling queue is 1.5 KB, for an outbound interface with a rate of 1GE, the scheduling cycle of each scheduling queue is 15 us; for outbound interfaces with a rate of 10GE, 100GE, and 1T respectively, the scheduling cycle of each scheduling queue is 1.5 us, 150 ns, and 15 ns, respectively.

At S303, the packet in the first scheduling queue is forwarded to a second network device according to a scheduling cycle of the first scheduling queue.

In the example of the present disclosure, the first queue sequence includes a first number of consecutive scheduling queues, each scheduling queue corresponds to one scheduling cycle, and the first network device forwards the packet cached in the first queue sequence to the second network device according to the scheduling cycle of each scheduling queue.

The second network device is a next-hop device connected to the first network device in the deterministic network. For example, if the forwarding path of the first packet in the deterministic network is PE1-P1-P2-PE2, then the first network device can be PE1, and the second network device is P1.

With the examples of the present disclosure, after receiving the first packet sent by the user-side device, the first network device can cache the first packet in a first scheduling queue, corresponding to a deterministic flow to which the first packet belongs, in a first queue sequence, and forward the packet in the first scheduling queue to a second network device according to a scheduling cycle of the first scheduling queue. The first queue sequence includes a first number of cyclically consecutive scheduling queues, wherein the first number is the ratio between the rate of the outbound interface used by the first network device to forward the first packet and the minimum inbound interface rate of the first network device, that is, the number of scheduling queues depends on the minimum inbound interface rate. In this way, the packet of each deterministic flow simultaneously received by the inbound interfaces of the first network device has a corresponding scheduling queue for caching the packet. In this way, even if the transmission rate span of each deterministic flow is large, the packet of each deterministic flow can be cached in the scheduling queue corresponding to the deterministic flow, and sent in the scheduling cycle corresponding to the respective scheduling queue, so that the deterministic transmission of each deterministic flow can be realized when the transmission rate span of the deterministic flow is large, which is more in line with the needs of deterministic services.

Optionally, each scheduling queue in the first queue sequence is configured as at least one maximum transmission unit (MTU), and each MTU has a size of 1.5 KB.

Since the packet length span of deterministic services is large, for example, the packet length span can be 64B to 1.5 KB, the forwarding mechanism for the deterministic flow of the deterministic network has a problem that the above-mentioned packet length span cannot be supported. In order to implement the deterministic service, the size of the scheduling queue must at least meet the MTU size of the deterministic service, so as to ensure that the first network device has a deterministic forwarding capability for the deterministic service.

In the example of the present disclosure, the size of each scheduling queue is at least 1.5 KB, that is, the scheduling queue can accommodate the packet of any length in the range of 64B to 1.5 KB, and can cache and forward multiple packets with a large packet length span.

When each scheduling queue is configured with one MTU, the worst case of bandwidth utilization when forwarding a packet in the scheduling queue is about 50%. For example, if for a deterministic flow, one packet of 751B and one packet of 750B are continuously received, then after the first packet of 751B is cached in a scheduling queue, the remaining space is not enough to cache the packet of 750B, then only the packet of 751B in the scheduling queue is sent in the scheduling cycle of the scheduling queue, and the bandwidth utilization rate is about 50%.

Similarly, if each scheduling queue is configured with 2 MTUs, the worst bandwidth utilization rate is about 66%; if each scheduling queue is configured with 3 MTUs, the worst bandwidth utilization rate is about 75%.

Therefore, if the service can allow 50% bandwidth utilization, each scheduling queue can be configured with 1 MTU. For requirements that need to increase the bandwidth utilization to 66%, each scheduling queue can be configured with 2 MTUs. For requirements that need to increase the bandwidth utilization to 77%, each scheduling queue can be configured with 3 MTUs.

As an example, taking each scheduling queue configured as one MTU as an example, in the case that the minimum inbound interface rate of the first network device is 100 Mbps, as shown in Table 1, if the outbound interface rate of the first network device is 1 Gbps, the number of scheduling queues included in the first queue sequence is 1 Gbps/100 Mbps=10, and the length of the first queue sequence is 10 MTU=15 KB.

If the outbound interface rate of the first network device is 10 Gbps, the number of scheduling queues included in the first queue sequence is 10 Gbps/100 Mbps=100, and the length of the first queue sequence is 100 MTU=150 KB.

If the outbound interface rate of the first network device is 100 Gbps, the number of scheduling queues included in the first queue sequence is 100 Gbps/100 Mbps=1000, and the length of the first queue sequence is 1000 MTU=1.5 MB.

If the outbound interface rate of the first network device is 1 Tbps, the number of scheduling queues included in the first queue sequence is 1 Tbps/100 Mbps=10000, and the length of the first queue sequence is 10000 MTU=15 MB.

TABLE 1

| Minimum inbound interface rate (bps) | Outbound interface rate (bps) | Number of scheduling queues | Length of first queue sequence (Bytes) = 1.5 KB |
|---|---|---|---|
| 100M | 1 G | 10 | 10 MTU = 15 KB |
| 100M | 10 G | 100 | 100 MTU = 150 KB |
| 100M | 100 G | 1000 | 1000 MTU = 1.5 MB |
| 100M | 1 T | 10000 | 10000 MTU = 15 MB |

Similarly, taking each scheduling queue configured as one MTU as an example, when the minimum inbound interface rate of the first network device is 1000 Mbps, the number of scheduling queues included in the first queue sequence and the length information of the first queue sequence are shown in Table 2.

TABLE 2

| Minimum inbound interface rate (bps) | Outbound interface rate (bps) | Number of scheduling queues | Length of first queue sequence (Bytes) n = 1.5 KB |
|---|---|---|---|
| 1000M | 10 G | 10 | 10 MTU = 15 KB |
| 1000M | 100 G | 100 | 100 MTU = 150 KB |
| 1000M | 1 T | 1000 | 1000 MTU = 1.5 MB |

The scheduling cycle of the first queue sequence is explained below.

In this example of the present disclosure, the scheduling cycle duration of the first queue sequence is the ratio between the length of the first queue sequence and the outbound interface rate. Since the lengths of the scheduling queues included in the first queue sequence are same, the scheduling cycle duration of each scheduling queue included in the first queue sequence is the ratio between the scheduling cycle duration of the first scheduling queue and the number of scheduling queues included in the first scheduling queue, and scheduling cycle durations of all scheduling queues included in the first queue sequence are same.

Wherein, the scheduling cycle duration T of the first queue sequence may be understood as a duration required for all packets in the first queue sequence to be forwarded.

The specific calculation formula is:

First queue sequence cycle $T$=frame length*8*the number of MTUs included in the first queue sequence/outbound interface rate.

Data transmission between network devices can be performed in a unit of frame, so the first network device can encapsulate each packet into a frame, each frame including a MTU, an Internet Protocol Version 4 (IPv4) header or an Internet Protocol Version 6 (IPv6) header, an Ethernet Destination MAC (DMAC) address, an Ethernet Source MAC (SMAC) address, a type, an Ethernet MAC Cyclic Redundancy Check (Ethernet MAC CRC) code, a byte frame gap and a preamble.

Further, frame length=1.5 KB (length of MTU)+20 bytes (length of IPv4 header) or 40 bytes (length of IPV6 header)+ 14 bytes (6 bytes of DMAC+6 bytes of SMAC+2 bytes of Type)+4 bytes (length of Ethernet MAC CRC)+12 bytes (byte frame gap)+8 bytes (preamble length).

Taking each scheduling queue configured as one MTU as an example, when the minimum inbound interface rate of the first network device is 100 Mbps, the length of the first queue sequence corresponding to the rate of each outbound interface and the scheduling cycle of the first queue sequence are as shown in Table 3.

For example, when the outbound interface rate is 1G, the first queue sequence cycle=(1.5*1024+40+14+4+12+8) *8*10/1G≈126.56 us.

TABLE 3

| Minimum inbound interface rate (bps) | Outbound interface rate (bps) | Length of first queue sequence (Bytes) MTU = 1.5 KB | Scheduling cycle of first queue sequence (us) |
|---|---|---|---|
| 100M | 1 G | 10 MTU = 15 KB | ≈126.56 |
| 100M | 10 G | 100 MTU = 150 KB | ≈126.56 |
| 100M | 100 G | 1000 MTU = 1.5 MB | ≈126.56 |
| 100M | 1 T | 10000 MTU = 15 MB | ≈126.56 |

Taking each scheduling queue configured as one MTU as an example, when the minimum inbound interface rate of the first network device is 1000 Mbps, the length of the first queue sequence corresponding to the rate of each outbound interface and the scheduling cycle of the first queue sequence are as shown in Table 4.

TABLE 4

| Minimum inbound interface rate (bps) | Outbound interface rate (bps) | Length of first queue sequence (Bytes) MTU = 1.5 KB | Scheduling cycle of first queue sequence (us) MTU = 1.5 KB |
|---|---|---|---|
| 1000M | 10 G | 10 MTU = 15 KB | ≈12.66 |
| 1000M | 100 G | 100 MTU = 150 KB | ≈12.66 |
| 1000M | 1 T | 1000 MTU = 1.5 MB | ≈12.66 |

It can be understood that, if the configured MTU of each scheduling queue increases, the length of the scheduling cycle of the first queue sequence also increases.

Taking each scheduling queue configured as 2 MTUs as an example, when the minimum inbound interface rate of the first network device is 100 Mbps, the length of the first queue sequence corresponding to the rate of each outbound interface and the scheduling cycle of the first queue sequence are as shown in Table 5.

TABLE 5

| Minimum inbound interface rate (bps) | Outbound interface rate (bps) | Length of first queue sequence (Bytes) MTU = 1.5 KB | Scheduling cycle of first queue sequence (us) |
|---|---|---|---|
| 100M | 1 G | 10*2 MTU = 30 KB | ≈253 |
| 100M | 10 G | 100*2 MTU = 300 KB | ≈253 |
| 100M | 100 G | 1000*2 MTU = 3 MB | ≈253 |
| 100M | 1 T | 10000*2 MTU = 30 MB | ≈253 |

Taking each scheduling queue configured as 2 MTUs as an example, when the minimum inbound interface rate of the first network device is 1000 Mbps, the length of the first queue sequence corresponding to the rate of each outbound interface and the scheduling cycle of the first queue sequence are as shown in Table 6.

TABLE 6

| Minimum inbound interface rate (bps) | Outbound interface rate (bps) | Length of first queue sequence (Bytes) MTU = 1.5 KB | Scheduling cycle of first queue sequence (us) |
|---|---|---|---|
| 1000M | 10 G | 10*2 MTU = 30 KB | ≈25.3 |
| 1000M | 100 G | 100*2 MTU = 300 KB | ≈25.3 |
| 1000M | 1 T | 1000*2 MTU = 3 MB | ≈25.3 |

It can be understood that, in order to realize the deterministic delay in the forwarding process of each deterministic flow, the scheduling queue in the first queue sequence needs to be reserved in advance for each deterministic flow. The sending rates of different deterministic flows that the PE device is responsible for forwarding may be different. The higher the sending rate is, the larger the required cache space of the scheduling queue is.

Based on this, in the example of the present disclosure, on the one hand, if the sending rate of the deterministic flow is less than or equal to the minimum inbound interface rate, one specified scheduling queue in the first queue sequence is used to cache the packet of the deterministic flow.

Wherein, if the sending rate of the deterministic flow is less than or equal to the minimum inbound interface rate, it means that the sending rate of the deterministic flow is lower, and one scheduling queue is enough to cache the packet of the deterministic flow, so one specified scheduling queue is allocated for this deterministic flow to improve resource utilization.

For example, if the minimum inbound interface rate is 100 Mbps, and the sending rate of the deterministic flow is 90 Mbps, the deterministic flow corresponds to one specified scheduling queue in the first queue sequence.

Correspondingly, when the sending rate of the deterministic flow is less than or equal to the minimum inbound interface rate, the above S302 can be specifically implemented as:

caching the first packet into one specified scheduling queue corresponding to the deterministic flow in the first queue sequence.

On the other hand, if the sending rate of the deterministic flow is greater than the minimum inbound interface rate, a second number of cyclically consecutive scheduling queues in the first queue sequence are used to cache the packet of the deterministic flow. Wherein the second number is a value obtained by rounding up the ratio between the sending rate and the minimum inbound interface rate.

Wherein, if the sending rate of the deterministic flow is greater than the minimum inbound interface rate, it means that the sending rate of the deterministic flow is higher, and one scheduling queue is not enough to cache the packet of the deterministic flow, so more than one specified scheduling queues are allocated for the deterministic flow to prevent the packets of the deterministic flow from being lost and affecting the service.

For example, if the minimum inbound interface rate is 100 Mbps, and the sending rate of the deterministic flow is 150 Mbps, the deterministic flow corresponds to 2 specified scheduling queues in the first queue sequence.

Correspondingly, when the sending rate of the deterministic flow is greater than the minimum inbound interface rate, the above S302 can be specifically implemented as:

caching the first packet into one of the second number of cyclically consecutive scheduling queues corresponding to the deterministic flow in the first queue sequence.

It should be noted that, when the first network device receives the packet of the deterministic flow, it needs to cache the received packet in the second number of cyclically consecutive scheduling queues in sequence according to the order of the received packet, and the second number of cyclically consecutive scheduling queues will be occupied in sequence. When the first network device receives the first packet, it will cache the first packet in the second number of cyclically consecutive scheduling queues, which is not fully occupied yet and has enough remaining space to cache the first packet.

Through the above two aspects, on the basis of improving resource utilization as much as possible, all the deterministic flows with lower or higher sending rates all correspond to scheduling queues the number of which matches the sending rate. Thus, the deterministic forwarding of a deterministic flow with a lower sending rate and the deterministic forwarding of a deterministic flow with a higher sending rate can be ensured, which can meet the needs of deterministic services with various sending rates.

Optionally, there may also be micro-bursts in the transmission of deterministic flow. Micro-bursts refer to a situation in which a very large amount of burst data is received in a short period of time, and the instantaneous burst rate far exceeds an average rate.

For example, if the bandwidth of the inbound interface of the first network device is 100 Mbps and the outbound interface rate is 1GE, micro-bursts may occur in this case, and the instantaneous rate of the packets of deterministic flows that may continuously arrive at the inbound interface may exceed 100 Mbps. And if there is not enough space to cache these packets in the first queue sequence, packet loss will occur, and the deterministic delay of deterministic flows cannot be guaranteed.

To solve this problem, multiple queue sequences may be set in the first network device in the example of the present disclosure to cache packets with micro-bursts. However, the packets in each queue sequence need to be sent in sequence, so the more the number of queue sequences, the more micro-burst packets that can be cached, but the longer the delay of micro-burst packets will be, which will affect the delay jitter of the deterministic flow. In the example of the present disclosure, in order to balance the caching capacity for micro-burst packets and the delay jitter of the deterministic flow, two queue sequences can be set, namely the first queue sequence and the second queue sequence. For the packet that arrives at the inbound interface in advance, the first network device may cache the packet into the scheduling queue, corresponding to the deterministic flow to which the packet belongs, in the second queue sequence.

Figure 5:
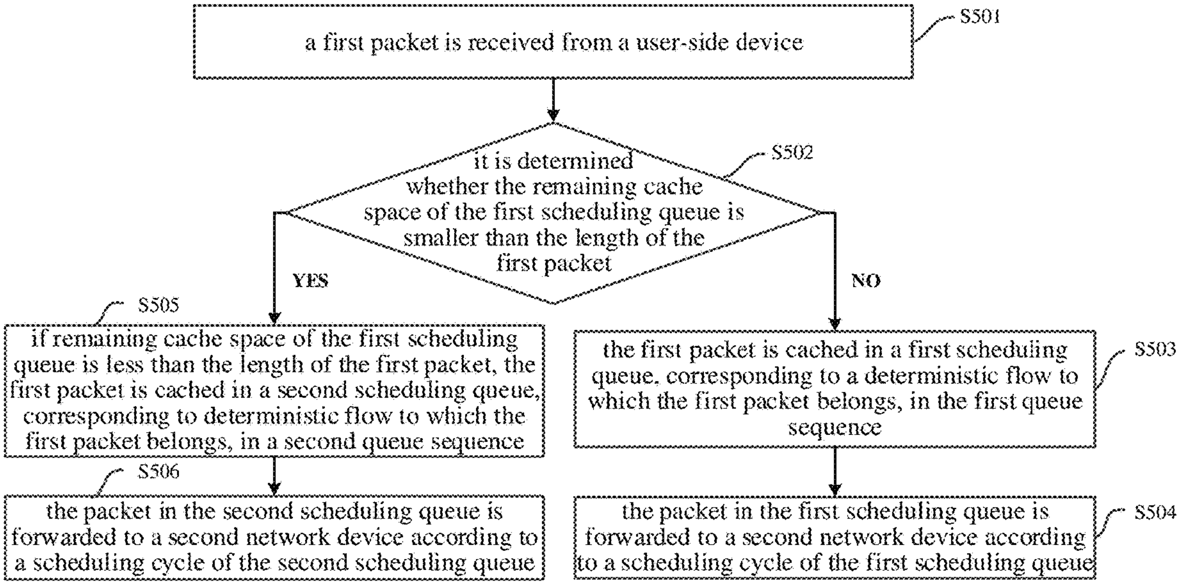
FIG. 5 is a schematic flowchart of another packet forwarding method according to an example of the present disclosure.

In the case where two queue sequences are set in the first network device, as shown in FIG. 5, the method includes:

At S501, a first packet is received from a user-side device.

Wherein, S501 is the same as S301, and reference may be made to the relevant description in S301.

At S502, it is determined whether the remaining cache space of the first scheduling queue is smaller than the length of the first packet.

If not, S503-S504 are executed; if yes, S505-S506 are executed.

At S503, the first packet is cached in a first scheduling queue, corresponding to a deterministic flow to which the first packet belongs, in the first queue sequence.

At S504, the packet in the first scheduling queue is forwarded to a second network device according to a scheduling cycle of the first scheduling queue.

Wherein, S503-S504 are the same as S302-S303, and reference may be made to the relevant description in S302-S303.

At S505, if the remaining cache space of the first scheduling queue is less than the length of the first packet, the first packet is cached in a second scheduling queue, corresponding to the deterministic flow to which the first packet belongs, in a second queue sequence.

Wherein the second queue sequence includes a first number of cyclically consecutive scheduling queues, the first queue sequence and the second queue sequence have consecutive cycles, and the scheduling queues included in the first queue sequence and the second queue sequence have same information.

That is, each scheduling queue in the second queue sequence is configured as at least one MTU, and each MTU has a size of 1.5 KB.

The number of scheduling queues included in the first queue sequence is the same as that of scheduling queues included in the second queue sequence, and the size and scheduling cycle duration of the scheduling queues included in the first queue sequence and the second queue sequence are same.

Moreover, the scheduling cycle durations of the first queue sequence and the second queue sequence are same.

In addition, the scheduling sequences at the same positions in the first queue sequence and the second queue sequence are used for caching the packets of the same deterministic flow.

After the first network device receives the first packet, if the remaining cache space of the first scheduling queue is less than the length of the first packet, it means that a micro-burst is currently occurring, and the first network device can cache the first packet into a second scheduling queue in the second queue sequence.

At S506, the packet in the second scheduling queue is forwarded to a second network device according to a scheduling cycle of the second scheduling queue.

Wherein the position of the second scheduling queue in the second queue sequence is the same as the position of the first scheduling queue in the first queue sequence.

The scheduling cycle durations of the first queue sequence and the second queue sequence are both T. The first network device first forwards the packet in the first queue sequence to the second network device in the cycle T of the first queue sequence, and then forwards the packet in the second queue sequence to the second network device in the cycle T of the second queue sequence.

That is, the total scheduling cycle durations of the first queue sequence and the second queue sequence are 2T.

In addition, the micro-burst problem can also be solved by setting the number of MTUs configured in each scheduling queue. For example, if the minimum inbound interface rate of the first network device is 100 Mbps, MTU=1.5 KB, and each scheduling queue is configured with 2 MTUs, the scheduling cycle duration of each queue sequence is 253 us. When two queue sequences are set, micro-burst close to 506 us can be cached.

With this method, after receiving the first packet, in the case that the remaining cache space of the first scheduling queue is sufficient to cache the first packet, the first packet is cached in the first scheduling queue of the first queue sequence; if the remaining cache space of the first scheduling queue is insufficient to cache the first packet, the first packet is cached in the second scheduling queue of the second queue sequence. In this way, in the case of micro-burst, even if the first queue sequence is not enough to cache the micro-burst packet, the scheduling queue in the second queue sequence can be used to cache the micro-burst packet, which can alleviate the micro-burst problem.

On the basis of the above example, the example of the present disclosure also needs to consider the requirements on the delay jitter, and the maximum delay jitter is the cycle duration of two queue sequences, that is, 2T.

Assuming that the minimum inbound interface rate is 100 Mbps, and each scheduling queue is configured with one MTU, the cycle of one queue sequence is T≈150 us, and the cycle of two queue sequences is 2T≈300 us, that is, the maximum delay jitter is 300 us. If each scheduling queue is configured with two MTUs, the cycle of one queue sequence is T≈300 us, and the cycle of two queue sequences is 2T≈600 us, that is, the maximum delay jitter is 600 us.

If the service is relatively sensitive to delay jitter, in another example of the present disclosure, in order to make the queue sequence suitable for the service more sensitive to delay jitter, multiple subsequences may be set for the first queue, and each subsequence includes multiple scheduling queues. For a deterministic flow of a delay-sensitive service, scheduling queues in multiple subsequences can be allocated for the deterministic flow in advance, thereby increasing the sending frequency of the deterministic flow and reducing the delay jitter.

For example, if the maximum delay required by the service is about 60 us, the scheduling cycle of each subsequence in the first queue sequence may be 30 us.

It should be noted that, due to the limitation of the uplink bandwidth and MTU on the network side, the scheduling cycle of a single sequence cannot be too short, otherwise the packet of one MTU cannot be sent. In this example of the present disclosure, the sacrifice of bandwidth utilization or the sacrifice of delay jitter can be balanced, and the number of sequences included in each queue sequence can be set as no more than 10, and when the queue sequence includes subsequences, the minimum inbound interface rate is 100M, and the outbound interface rate has a minimum value of 10GE.

Likewise, the second queue sequence may also include multiple subsequences.

When the first queue sequence includes subsequences, on the one hand, if the sending rate of the deterministic flow is less than or equal to the minimum inbound interface rate, a specified scheduling queue in each subsequence is used to cache the packets of the deterministic flow.

Correspondingly, when the sending rate of the deterministic flow is less than or equal to the minimum inbound interface rate, the above S302 can be specifically implemented as:

caching the first packet into one specified scheduling queue corresponding to the deterministic flow in one subsequence of the first queue sequence.

Wherein each subsequence of the first queue sequence includes one specified scheduling queue corresponding to the deterministic flow. The packets of the deterministic flow will occupy specified scheduling queues in each subsequence in the first queue sequence in sequence. For example, if the first queue sequence includes 5 subsequences, the specified scheduling queues in the current first three subsequences have all been completely occupied, the first packet can be cached in the specified scheduling queue in the fourth subsequence.

On the other hand, if the sending rate of the deterministic flow is greater than the minimum inbound interface rate, the second number of cyclically consecutive scheduling queues in each subsequence are used to cache the packets of the deterministic flow, and the second number is a value obtained by rounding up the ratio between the sending rate and the minimum inbound interface rate.

Correspondingly, when the sending rate of the deterministic flow is greater than the minimum inbound interface rate, the above S302 can be specifically implemented as:

caching the first packet into one of a second number of cyclically consecutive scheduling queues corresponding to the deterministic flow in one subsequence of the first queue sequence.

Wherein each subsequence of the first queue sequence includes the second number of cyclically consecutive scheduling queues corresponding to the deterministic flow. Wherein the second number is a value obtained by rounding up the ratio between the sending rate and the minimum inbound interface rate.

It should be noted that, when the first network device receives the packets of the deterministic flow, it will sequentially cache the packets in the multiple subsequences allocated for the deterministic flow in the first queue sequence according to the order of the received packets, and the packets of the deterministic flow will occupy the scheduling queues corresponding to the deterministic flow in the multiple subsequences.

For example, if the first queue sequence includes 5 subsequences, and two consecutive scheduling queues at the same position in each subsequence have been allocated to this deterministic flow, it is assumed that the two consecutive scheduling queues in the first two subsequences are currently fully occupied, the first scheduling queue allocated for the deterministic flow in the third subsequence has been fully occupied, and the second scheduling queue has not been fully occupied for the time being, then the first packet is cached in the second scheduling queue among the two consecutive scheduling queues allocated for the deterministic flow in the third subsequence.

In the example of the present disclosure, the packet sending frequency of the deterministic flow varies from once in a few microseconds to once in a few milliseconds, and the sending frequency span is large. In the example of the present disclosure, by setting sub sequences in the queue sequence, a scheduling queue can be allocated for the deterministic flow according to the packet sending frequency requirement of the deterministic flow. For example, for a deterministic flow with a high delay jitter requirement, the scheduling queue in each subsequence may be allocated to the deterministic flow; for a deterministic flow with a delay jitter requirement, scheduling queues in several subsequences with fixed intervals can be allocated for the deterministic flow, or even only one scheduling sequence in the entire queue sequence can be allocated for the deterministic flow. In this way, it can meet the requirements of a large packet sending frequency span of the deterministic flow.

The following is explained with specific examples. If each scheduling queue is configured as one MTU, and the minimum inbound interface rate of the first network device is 100 Mbps, the queue sequence cycle corresponding to the rate of each outbound interface, the number of subsequences included in each queue sequence, the minimum delay jitter, and the number of queue sequences are shown in Table 7.

TABLE 7

| Outbound interface rate (bps) | Number of scheduling queues | Length of scheduling queue | Cycle of scheduling queue | Number of subsequences | Minimum delay jitter | Number of scheduling queues |
|---|---|---|---|---|---|---|
| 10 GE | 100 | 1 MTU | ≈150 us | 10 | ≈30 us | 2 |
| 100 GE | 1000 | 1 MTU | ≈150 us | 10 | ≈30 us | 2 |
| 1 TE | 10000 | 1 MTU | ≈150 us | 10 | ≈30 us | 2 |

If each scheduling queue is configured as 2 MTU, and the minimum inbound interface rate of the first network device is 100 Mbps, the cycle of the queue sequence corresponding to the rate of each outbound interface, the number of subsequences included in each queue sequence, the minimum delay jitter, and the number of queue sequences are shown in Table 8.

TABLE 8

| Outbound interface rate (bps) | Number of scheduling queues | Length of scheduling queue | Cycle of scheduling queue | Number of subsequences | Minimum delay jitter | Number of scheduling queues |
|---|---|---|---|---|---|---|
| 10 GE | 100 | 2 MTU | ≈300 us | 10 | ≈60 us | 2 |
| 100 GE | 1000 | 2 MTU | ≈300 us | 10 | ≈60 us | 2 |
| 1 TE | 10000 | 2 MTU | ≈300 us | 10 | ≈60 us | 2 |

The implementation of the scheduling queue in the above example will be described below.

If the first queue sequence does not include a subsequence, each scheduling queue included in the first queue sequence can be a physical queue.

Alternatively, in order to prevent excessive consumption of queue resources, each scheduling queue can also be a virtual queue.

If the first queue sequence includes subsequences, each subsequence included in the first queue sequence is a physical queue in the first network device, and each scheduling queue included in each subsequence is a virtual queue.

Optionally, each virtual queue in the example of the present disclosure can be a traffic shaping leaky bucket queue. That is, a leaky bucket algorithm of credit-based traffic shaping can be used to implement each virtual queue, and multiple traffic shaping leaky bucket queues share one physical queue.

As an example, if each scheduling queue is configured as one MTU, and the minimum inbound interface rate of the first network device is 100 Mbps, the queue sequence cycle corresponding to the rate of each outbound interface, the number of subsequences included in each queue sequence, the minimum delay jitter, the number of queue sequences, the number of leaky buckets included in each queue sequence, the number of leaky buckets included in each subsequence, the total number of leaky buckets included in the two queue sequences and the total cache demand are shown in Table 9.

closure, the P device does not need to use a complex queue described in the above example to forward the packet. After the inbound interface of the P device receives the packet, it can send the packet at the outbound interface after an offset of a few time slots, as long as the maximum delay requirement of the deterministic flow is met. That is to say, the P device can use a higher rate and a smaller cache to forward the packet.

The P device can cache the received packet according to one cycle T. In the case that the outbound interface rate of the P device is relatively high, it can even use a period of T/2 to cache the received packet.

For example, if the outbound interface rate is 1T, and if the maximum delay requirement is 150 us, a cache of 15 MB is required. According to the delay requirement (50 us) of the current 400G network Processing Unit (Neural-network Processing Unit (NPU)) system, the demand for the cache is controllable.

Using the examples of the present disclosure, on the basis of ensuring the achievability of the system and the chip, so that the forwarding mechanism for the deterministic flow in the deterministic network can meet various access rates (for example, from 100 Mbps to 100 Gbps) required by deterministic services, various packet sending frequencies (such

TABLE 9

| Outbound interface rate (bps) | Number of scheduling queues | Length of scheduling queue | Cycle of queue sequence | Number of subsequences | Minimum delay jitter | Number of queue sequences | Number of leaky buckets included in each queue sequence | Number of leaky buckets included in each subsequence | Total number of leaky buckets | Total buffer demand |
|---|---|---|---|---|---|---|---|---|---|---|
| 10 GE | 100 | 1 MTU | ≈150 us | 10 | ≈30 us | 2 | 100 | 10 | 200 | 300 KB |
| 100 GE | 1000 | 1 MTU | ≈150 us | 10 | ≈30 us | 2 | 1000 | 100 | 2000 | 3 MB |
| 1 TE | 10000 | 1 MTU | ≈150 us | 10 | ≈30 us | 2 | 10000 | 1000 | 20000 | 30 MB |

As an example, if each scheduling queue is configured as 2 MTU, and the minimum inbound interface rate of the first network device is 100 Mbps, the queue sequence cycle corresponding to the rate of each outbound interface, the number of subsequences included in each queue sequence, the minimum delay jitter, the number of queue sequences, the number of leaky buckets included in each queue sequence, the number of leaky buckets included in each subsequence, the total number of leaky buckets included in the two queue sequences and the total cache demand are shown in Table 10.

as from microseconds to seconds) and various lengths of packets (such as from 64B to 1.5 KB), thereby building a better deterministic flow forwarding mechanism.

Figure 6:
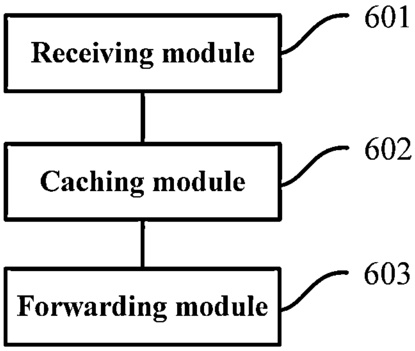
FIG. 6 is a schematic structural diagram of a packet forwarding apparatus according to an example of the present disclosure.

Based on the same inventive concept, the examples of the present disclosure further provide a packet forwarding apparatus, which is applied to a first network device. As shown in FIG. 6, the apparatus includes:

a receiving module 601, to receive a first packet from a user-side device;

a caching module 602, to cache the first packet in a first scheduling queue, corresponding to a deterministic

TABLE 10

| Outbound interface rate (bps) | Number of scheduling queues | Length of scheduling queue | Cycle of queue sequence | Number of subsequences | Minimum delay jitter | Number of queue sequences | Number of leaky buckets included in each queue sequence | Number of leaky buckets included in each subsequence | Total number of leaky buckets | Total buffer demand |
|---|---|---|---|---|---|---|---|---|---|---|
| 10 GE | 100 | 2 MTU | ≈300 us | 10 | ≈60 us | 2 | 100 | 10 | 200 | 600 KB |
| 100 GE | 1000 | 2 MTU | ≈300 us | 10 | ≈60 us | 2 | 1000 | 100 | 2000 | 6 MB |
| 1 TE | 10000 | 2 MTU | ≈300 us | 10 | ≈60 us | 2 | 10000 | 1000 | 20000 | 60 MB |

The first network device in this example of the present disclosure may be a PE device, and the second network device may be a P device. After receiving a packet forwarded by the PE device based on the deterministic flow forwarding mechanism in the example of the present disflow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

a forwarding module 603, to forward the packet in the first scheduling queue to a second network device according to a scheduling cycle of the first scheduling queue.

Optionally, each scheduling queue in the first queue sequence is configured as at least one maximum transmission unit (MTU), and each MTU has a size of 1.5 KB.

Optionally, when the sending rate of the deterministic flow is less than or equal to the minimum inbound interface rate, the caching module 602 is specifically to:

cache the first packet into one specified scheduling queue corresponding to the deterministic flow in the first queue sequence;

or, when the sending rate of the deterministic flow is greater than the minimum inbound interface rate, the caching module 602 is specifically to:

cache the first packet into one of a second number of cyclically consecutive scheduling queues corresponding to the deterministic flow in the first queue sequence; wherein the second number is a value obtained by rounding up a ratio between the sending rate and the minimum inbound interface rate.

Optionally, the first queue sequence includes multiple subsequences;

when the sending rate of the deterministic flow is less than or equal to the minimum inbound interface rate, the caching module 602 is specifically to:

cache the first packet into one specified scheduling queue corresponding to the deterministic flow in one subsequence of the first queue sequence; wherein each subsequence in the first queue sequence includes one specified scheduling queue corresponding to the deterministic flow;

or, when the sending rate of the deterministic flow is greater than the minimum inbound interface rate, the caching module 602 is specifically to:

cache the first packet into one of a second number of cyclically consecutive scheduling queues corresponding to the deterministic flow in one subsequence of the first queue sequence; wherein each subsequence in the first queue includes the second number of cyclically consecutive scheduling queues corresponding to the deterministic flow, and the second number is a value obtained by rounding up a ratio between the sending rate and the minimum inbound interface rate.

Optionally, the minimum inbound interface rate has a minimum value of 100M; and the outbound interface rate has a minimum value of 10GE.

Optionally, a scheduling cycle duration of the first queue sequence is a ratio between a length of the first queue sequence and the outbound interface rate, and scheduling cycle durations of all scheduling queues included in the first queue sequence are same.

Optionally, each subsequence included in the first queue sequence is a physical queue in the first network device;

each scheduling queue included in each subsequence is a virtual queue.

Optionally, the virtual queue is a traffic shaping leaky bucket queue.

Optionally, each scheduling queue included in the first queue sequence is a physical queue in the first network device.

Optionally, the caching module 602 is further to:

if a remaining cache space of the first scheduling queue is greater than or equal to a length of the first packet, cache the first packet in the first scheduling queue, corresponding to the deterministic flow to which the first packet belongs, in the first queue sequence;

if the remaining cache space of the first scheduling queue is less than the length of the first packet, cache the first packet in a second scheduling queue, corresponding to the deterministic flow to which the first packet belongs, in a second queue sequence; wherein the second queue sequence includes a first number of cyclically consecutive scheduling queues, the first queue sequence and the second queue sequence have consecutive cycles, and scheduling queues included in the first queue sequence and the second queue sequence have same information;

the forwarding module 603 is further to forward the packet in the second scheduling queue to a second network device according to a scheduling cycle of the second scheduling queue.

Figure 7:
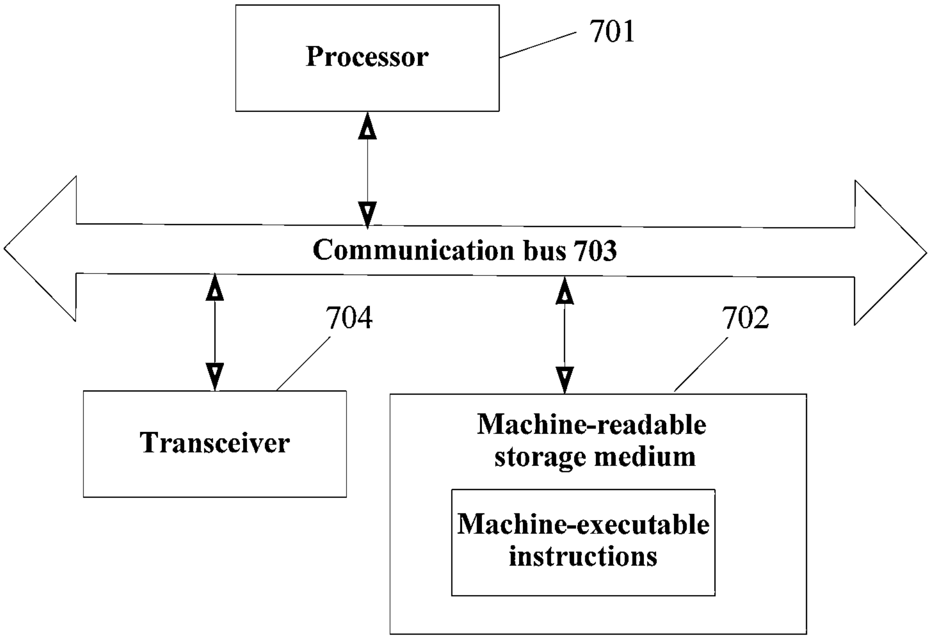
FIG. 7 is a schematic structural diagram of a network device according to an example of the present disclosure.

An example of the present disclosure also provides a network device, as shown in FIG. 7, the network device includes:

a processor 701;

a transceiver 704;

a machine-readable storage medium 702, which stores machine-executable instructions that can be executed by the processor 701 to cause the processor 701 to:

receive a first packet from a user-side device through the transceiver 704;

cache the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

forward the packet in the first scheduling queue to a second network device according to a scheduling cycle of the first scheduling queue through the transceiver 704.

Optionally, each scheduling queue in the first queue sequence is configured as at least one maximum transmission unit (MTU), and each MTU has a size of 1.5 KB.

Optionally, when the sending rate of the deterministic flow is less than or equal to the minimum inbound interface rate, the machine-executable instructions also cause the processor 701 to:

cache the first packet into one specified scheduling queue corresponding to the deterministic flow in the first queue sequence;

or, when the sending rate of the deterministic flow is greater than the minimum inbound interface rate, the machine-executable instructions also cause the processor 701 to:

cache the first packet into one of a second number of cyclically consecutive scheduling queues corresponding to the deterministic flow in the first queue sequence; wherein the second number is a value obtained by rounding up a ratio between the sending rate and the minimum inbound interface rate.

Optionally, the first queue sequence includes multiple subsequences;

when the sending rate of the deterministic flow is less than or equal to the minimum inbound interface rate, the machine-executable instructions also cause the processor 701 to:

cache the first packet into one specified scheduling queue corresponding to the deterministic flow in one subsequence of the first queue sequence; wherein each subsequence in the first queue sequence includes one specified scheduling queue corresponding to the deterministic flow;

or, when the sending rate of the deterministic flow is greater than the minimum inbound interface rate, the machine-executable instructions also cause the processor 701 to:

cache the first packet into one of a second number of cyclically consecutive scheduling queues corresponding to the deterministic flow in one subsequence of the first queue sequence; wherein each subsequence in the first queue includes the second number of cyclically consecutive scheduling queues corresponding to the deterministic flow, and the second number is a value obtained by rounding up a ratio between the sending rate and the minimum inbound interface rate.

Optionally, the minimum inbound interface rate has a minimum value of 100M; and the outbound interface rate has a minimum value of 10GE.

Optionally, a scheduling cycle duration of the first queue sequence is a ratio between a length of the first queue sequence and the outbound interface rate, and scheduling cycle durations of all scheduling queues included in the first queue sequence are same.

Optionally, each subsequence included in the first queue sequence is a physical queue in the first network device;

each scheduling queue included in each subsequence is a virtual queue.

Optionally, the virtual queue is a traffic shaping leaky bucket queue.

Optionally, each scheduling queue included in the first queue sequence is a physical queue in the first network device.

Optionally, the machine-executable instructions also cause the processor 701 to:

if a remaining cache space of the first scheduling queue is greater than or equal to a length of the first packet, cache the first packet in the first scheduling queue, corresponding to the deterministic flow to which the first packet belongs, in the first queue sequence;

if the remaining cache space of the first scheduling queue is less than the length of the first packet, cache the first packet in a second scheduling queue, corresponding to the deterministic flow to which the first packet belongs, in a second queue sequence; wherein the second queue sequence includes a first number of cyclically consecutive scheduling queues, the first queue sequence and the second queue sequence have consecutive cycles, and scheduling queues included in the first queue sequence and the second queue sequence have same information;

forward the packet in the second scheduling queue to a second network device according to a scheduling cycle of the second scheduling queue through the transceiver 704.

As shown in FIG. 7, the network device may also include a communication bus 703. The processor 701, the machine-readable storage medium 702, and the transceiver 704 communicate with each other through the communication bus 703. The communication bus 703 may be a Peripheral Component Interconnect (PCI) bus or an Extended Industry Standard Architecture (EISA) bus, etc. The communication bus 703 can include an address bus, a data bus, a control bus, or the like.

The transceiver 704 may be a wireless communication module, and under the control of the processor 701, the transceiver 704 performs data interaction with other devices.

The machine-readable storage medium 702 can include a random access memory (RAM), or can include a non-volatile memory (NVM), for example at least one disk memory. In addition, the machine-readable storage medium 702 can also be at least one storage device located away from the processor described above.

The aforementioned processor 701 can be a general-purpose processor, such as a central processing unit (CPU), a network processor (NP), or the like; it can also be a digital signal processor (DSP), an application specific integrated circuit (ASIC), a field-programmable gate array (FPGA) or other programmable logic device, a discrete gate or transistor logic device, a discrete hardware component.

Based on the same inventive concept, according to the packet forwarding method provided by the above examples of the present disclosure, the examples of the present disclosure further provide a machine-readable storage medium, which stores machine-executable instructions that can be executed by the processor and cause the processor to implement any of the above packet forwarding method.

In yet another example provided by the present disclosure, a computer program product including instructions is also provided, which, when running on a computer, causes the computer to execute any of the above packet forwarding method in the foregoing examples.

In the aforementioned examples, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the examples of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wirelessly (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, so that processes, methods, articles, or devices including a series of elements include not only those elements listed but also those not specifically listed or elements intrinsic to these processes, methods, articles, or device. Without further limitations, elements defined by the sentences "comprise(s) a . . . " or "include(s) a . . . " do not exclude that there are other identical elements in the processes, methods, articles, or devices which include these elements.

All the examples are described in corresponding ways, same or similar parts in each of the examples can be referred to one another, and the parts emphasized are differences to other examples. Particularly, the examples of the apparatus are described briefly, since they are similar to the examples of the method, and for similar parts, one could refer to the corresponding description of the examples of the method.

The description is only for preferred examples of the present disclosure, and is not intended to limit the present disclosure. Any modifications, substitutions, improvements, etc., which are made within the spirit and principles of the present disclosure, will fall into the protection scope of the present disclosure.

What is claimed is:

1. A packet forwarding method, which is applied to a first network device and comprises:

receiving a first packet from a user-side device;

caching the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

forwarding the packet in the first scheduling queue to a second network device according to a scheduling cycle of the first scheduling queue.

2. The method of claim 1, wherein each scheduling queue in the first queue sequence is configured as at least one maximum transmission unit (MTU), and each MTU has a size of 1.5 KB.

3. The method of claim 1, wherein when a sending rate of the deterministic flow is less than or equal to the minimum inbound interface rate, caching the first packet in the first scheduling queue, corresponding to the deterministic flow to which the first packet belongs, in the first queue sequence, comprises:

caching the first packet into one specified scheduling queue corresponding to the deterministic flow in the first queue sequence;

or, when the sending rate of the deterministic flow is greater than the minimum inbound interface rate, caching the first packet in the first scheduling queue, corresponding to the deterministic flow to which the first packet belongs, in the first queue sequence, comprises:

caching the first packet into one of a second number of cyclically consecutive scheduling queues corresponding to the deterministic flow in the first queue sequence; wherein the second number is a value obtained by rounding up a ratio between the sending rate and the minimum inbound interface rate.

4. The method of claim 1, wherein the first queue sequence comprises multiple subsequences;

when a sending rate of the deterministic flow is less than or equal to the minimum inbound interface rate, caching the first packet in the first scheduling queue, corresponding to the deterministic flow to which the first packet belongs, in the first queue sequence, comprises:

caching the first packet into one specified scheduling queue corresponding to the deterministic flow in one subsequence of the first queue sequence; wherein each subsequence in the first queue sequence includes one specified scheduling queue corresponding to the deterministic flow;

or, when the sending rate of the deterministic flow is greater than the minimum inbound interface rate, caching the first packet in the first scheduling queue, corresponding to the deterministic flow to which the first packet belongs, in the first queue sequence, comprises:

caching the first packet into one of a second number of cyclically consecutive scheduling queues corresponding to the deterministic flow in one subsequence of the first queue sequence; wherein each subsequence in the first queue includes the second number of cyclically consecutive scheduling queues corresponding to the deterministic flow, and the second number is a value obtained by rounding up a ratio between the sending rate and the minimum inbound interface rate.

5. The method of claim 4, wherein the minimum inbound interface rate is 100M; and the outbound interface rate has a minimum value of 10GE.

6. The method of claim 1, wherein a scheduling cycle duration of the first queue sequence is a ratio between a length of the first queue sequence and the outbound interface rate, and scheduling cycle durations of all scheduling queues included in the first queue sequence are same.

7. The method of claim 4, wherein each subsequence included in the first queue sequence is a physical queue in the first network device;

each scheduling queue included in each subsequence is a virtual queue.

8. The method of claim 7, wherein the virtual queue is a traffic shaping leaky bucket queue.

9. The method of claim 1, wherein each scheduling queue included in the first queue sequence is a physical queue in the first network device.

10. The method of claim 1, wherein after receiving the first packet from the user-side device, the method further comprises:

if a remaining cache space of the first scheduling queue is greater than or equal to a length of the first packet, caching the first packet in the first scheduling queue, corresponding to the deterministic flow to which the first packet belongs, in the first queue sequence;

if the remaining cache space of the first scheduling queue is less than the length of the first packet, caching the first packet in a second scheduling queue, corresponding to the deterministic flow to which the first packet belongs, in a second queue sequence; wherein the second queue sequence includes a first number of cyclically consecutive scheduling queues, the first queue sequence and the second queue sequence have consecutive cycles, and scheduling queues included in the first queue sequence and the second queue sequence have same information;

forwarding the packet in the second scheduling queue to a second network device according to a scheduling cycle of the second scheduling queue.

11. A non-transitory machine-readable storage medium storing machine-executable instructions thereon which, when invoked and executed by a processor, cause the processor to implement the method of claim 1.

12. A computer program product, which causes a processor to perform the method of claim 1.

13. A network device, comprising:

a processor;

a transceiver;

a machine-readable storage medium, which stores machine-executable instructions that can be executed by the processor to cause the processor to:

receive a first packet from a user-side device through the transceiver;

cache the first packet in a first scheduling queue, corresponding to a deterministic flow to which the first packet belongs, in a first queue sequence, wherein the first queue sequence includes a first number of cyclically consecutive scheduling queues, the first number is a ratio between an outbound interface rate of the first network device and a minimum inbound interface rate of the first network device, the outbound interface rate is a rate of an outbound interface for forwarding the first packet;

forward the packet in the first scheduling queue to a second network device according to a scheduling cycle of the first scheduling queue through the transceiver.

14. The network device of claim 13, wherein when a sending rate of the deterministic flow is less than or equal to the minimum inbound interface rate, the machine-executable instructions also cause the processor to:

cache the first packet into one specified scheduling queue corresponding to the deterministic flow in the first queue sequence;

or, when the sending rate of the deterministic flow is greater than the minimum inbound interface rate, the machine-executable instructions also cause the processor to:

cache the first packet into one of a second number of cyclically consecutive scheduling queues corresponding to the deterministic flow in the first queue sequence; wherein the second number is a value obtained by rounding up a ratio between the sending rate and the minimum inbound interface rate.

15. The network device of claim 13, wherein the first queue sequence comprises multiple subsequences;

when a sending rate of the deterministic flow is less than or equal to the minimum inbound interface rate, the machine-executable instructions also cause the processor to:

cache the first packet into one specified scheduling queue corresponding to the deterministic flow in one subsequence of the first queue sequence; wherein each subsequence in the first queue sequence includes one specified scheduling queue corresponding to the deterministic flow;

or, when the sending rate of the deterministic flow is greater than the minimum inbound interface rate, the machine-executable instructions also cause the processor to:

cache the first packet into one of a second number of cyclically consecutive scheduling queues corresponding to the deterministic flow in one subsequence of the first queue sequence; wherein each subsequence in the first queue includes the second number of cyclically consecutive scheduling queues corresponding to the deterministic flow, and the second number is a value obtained by rounding up a ratio between the sending rate and the minimum inbound interface rate.

16. The network device of claim 13, wherein a scheduling cycle duration of the first queue sequence is a ratio between a length of the first queue sequence and the outbound interface rate, and scheduling cycle durations of all scheduling queues included in the first queue sequence are same.

17. The network device of claim 15, wherein each subsequence included in the first queue sequence is a physical queue in the first network device;

each scheduling queue included in each subsequence is a virtual queue.

18. The network device of claim 17, wherein the virtual queue is a traffic shaping leaky bucket queue.

19. The network device of claim 13, wherein each scheduling queue included in the first queue sequence is a physical queue in the first network device.

20. The network device of claim 13, wherein the machine-executable instructions also cause the processor to:

if a remaining cache space of the first scheduling queue is greater than or equal to a length of the first packet, cache the first packet in the first scheduling queue, corresponding to the deterministic flow to which the first packet belongs, in the first queue sequence;

if the remaining cache space of the first scheduling queue is less than the length of the first packet, cache the first packet in a second scheduling queue, corresponding to the deterministic flow to which the first packet belongs, in a second queue sequence; wherein the second queue sequence includes a first number of cyclically consecutive scheduling queues, the first queue sequence and the second queue sequence have consecutive cycles, and scheduling queues included in the first queue sequence and the second queue sequence have same information;

forward the packet in the second scheduling queue to a second network device according to a scheduling cycle of the second scheduling queue through the transceiver.

* * * * *